United States Patent [19]

Murschall et al.

[11] Patent Number: 5,484,633
[45] Date of Patent: Jan. 16, 1996

[54] HEAT-SEALABLE, ORIENTED, MULTILAYER POLYOLEFIN FILM, PROCESS FOR THE PRODUCTION THEREOF, AND THE USE THEREOF

[75] Inventors: Ursula Murschall, Nierstein; Herbert Peiffer, Mainz; Gunter Schloegl, Kelkheim, all of Germany

[73] Assignee: Hoechst Aktiengesellschaft, Frankfurt, Germany

[21] Appl. No.: 197,827

[22] Filed: Feb. 17, 1994

[30] Foreign Application Priority Data

Feb. 27, 1993 [DE] Germany ............... 43 06 154.0

[51] Int. Cl.⁶ ............... B32B 27/32; B65D 65/40
[52] U.S. Cl. ............... 428/35.7; 428/349; 428/149; 428/352; 428/424.2; 428/404; 428/407; 428/331; 206/524.6
[58] Field of Search ............... 428/347, 349, 428/149, 352, 35.7, 424.2, 404, 407, 331, 334–336, 338; 266/524.6

[56] References Cited

U.S. PATENT DOCUMENTS

| | | | |
|---|---|---|---|
| 3,655,503 | 4/1972 | Stanley et al. | 161/165 |
| 4,117,193 | 9/1978 | Tsuchiya et al. | 428/339 |
| 4,224,080 | 9/1980 | Chambers et al. | 106/308 |
| 4,419,411 | 12/1983 | Park | 428/516 |
| 4,448,845 | 5/1984 | Jakuboski et al. | 428/404 |
| 4,482,655 | 11/1984 | Wilson | 523/200 |
| 4,622,237 | 11/1986 | Lori | 427/40 |
| 4,692,379 | 9/1987 | Keung et al. | 428/349 |
| 4,698,261 | 10/1987 | Bothe et al. | 428/204 |
| 4,734,317 | 3/1988 | Bothe et al. | 428/215 |
| 4,911,976 | 3/1990 | Park et al. | 428/216 |
| 4,912,091 | 3/1990 | Bothe et al. | 428/35.2 |
| 5,110,671 | 5/1992 | Balloni et al. | 428/218 |
| 5,137,955 | 8/1992 | Tsuchiya et al. | 524/310 |
| 5,175,051 | 12/1992 | Schloegl et al. | 428/323 |

FOREIGN PATENT DOCUMENTS 0408971  1/1991  European Pat. Off. .

OTHER PUBLICATIONS

Ullman, Encyklöpadie der technschen Chemie, 4rl Ed, vol. 12, pp. 525–555, Considered to extent disclosed in specification, Database WPI; Derwent Publications Ltd. JP–A–1 065 175.

Primary Examiner—Charles R. Nold
Attorney, Agent, or Firm—Foley & Lardner

[57] ABSTRACT

An oriented, multilayer polyolefin film is described. It includes a base layer essentially containing polypropylene, and at least one heat-sealable outer layer. The heat-sealable outer layer contains from 0.1 to 0.5% by weight of $SiO_2$ which has been subjected to organic aftertreatment coating and has a mean particle diameter of from 2 to 6 µm, preferably from 4 to 5 µm. The ratio between the mean particle diameter and the outer layer thickness is in the range from 3 to 11. Also described is a process for the production of the multilayer polyolefin film and the use thereof.

18 Claims, No Drawings

HEAT-SEALABLE, ORIENTED, MULTILAYER POLYOLEFIN FILM, PROCESS FOR THE PRODUCTION THEREOF, AND THE USE THEREOF

BACKGROUND OF THE INVENTION

1. Field of the Invention

The invention relates to an oriented, multilayer polyolefin film comprising a base layer essentially comprising polypropylene, and at least one heat-sealable outer layer. These films are distinguished by a low coefficient of friction in combination with excellent heat-sealability and outstanding antistatic properties.

2. Description of the Related Art

Films having low coefficients of friction are known. The demands on the processing properties of the films and their smooth running through automatic machines have continually increased over the years. For this reason, ever-lower coefficients of friction are required. Today the adjective "low" describes friction values which cover an order of magnitude of from 0.3 to 0.1, whereas a few years ago a friction of 0.4 to 0.5 was regarded as extremely "low".

DE-A-20 01 032 describes films made from various thermoplastics whose surface-slip characteristics have been improved by addition of carboxamides and antiblocking agents. Since it is not possible for a sufficient amount of lubricant to be incorporated into the outer layers alone, the additional incorporation of the amides into the base layer is recommended. These films have a coefficient of friction in the range from 0.4 to 0.8 and thus no longer meet today's quality requirements.

U.S. Pat. No. 4,117,193 describes multilayer films comprising a polypropylene base layer containing a lubricant, an antiblocking agent and an antistatic. The outer layers of these films comprise a polymer blend and additionally contain a lubricant and an antiblocking agent. The polymer blend comprises an ethylene-butylene copolymer and a polyolefinic resin such as HDPE or LDPE. It is disclosed that the poor surface-slip characteristics of the films cannot be sufficiently improved by the addition of lubricants and antiblocking agents alone. For this reason, the outer layer is modified by addition of HDPE or LDPE in combination with a lubricant and antiblocking agent. According to the examples and comparative examples, the reduction in the coefficient of friction is essentially due to the addition of HDPE. Pure copolymeric outer layers with the same additive composition have coefficients of friction of from 0.7 to 0.8. The films combine excellent coefficients of friction with good printability, but are highly unsatisfactory in haze and gloss due to the addition of the friction-reducing polyolefinic resin.

EP-A-0 402 100 describes polypropylene films which contain from 0.01 to 0.5% by weight of a spherical $SiO_2$ and from 0.3 to 5% by weight of a hydroxy fatty acid glyceride. This invention relates to single-layer and multilayer films. Multilayer embodiments contain the combination of $SiO_2$ and glyceride both in the outer layer and in the base layer. It is disclosed that the selected amounts of $SiO_2$ and glyceride are essential for the advantageous properties of the films and deviations from these ranges no longer give the desired result. The films are distinguished by good transparency, surface-slip characteristics and adhesion to metal. However, they develop a coating on the surface after an extended storage time which impairs the appearance of the films. This effect is also known as blooming and is caused by migration of certain additives, in particular the glycerides, to the surface of the films.

EP-A-0 182 463 describes a multilayer film which contains from 0.05 to 0.2% by weight of tertiary aliphatic amine in the base layer and a combination of silicone oil and $SiO_2$ in the heat-sealable outer layer. According to the description, the surprising interaction of $SiO_2$, silicone oil and amine in combination with a selected outer layer thickness of less than 0.8 μm gives films having coefficients of friction of 0.3 or less. In spite of this excellent coefficient of friction, the processing properties of the film are poor. In particular, it is not printable and is therefore unsuitable for many applications.

EP-A-0 143 130 discloses films which contain a carboxamide in the base layer and likewise the combination of silicone oil and $SiO_2$ in the outer layer. Like in the above-mentioned EP-A-0 182 463, a synergistic action of the three selected components on the coefficient of friction is described. These films likewise have poor processing properties in spite of their advantageous surface-slip characteristics. Again, they lack the important property of printability.

EP-A-0 194 588 and EP-A-0 217 598 describe a further-developed film which is readily printable in spite of good surface-slip characteristics, due to the addition of silicone oil. In these films, silicone oil, if desired in combination with $SiO_2$, is only incorporated into one outer layer. The second, silicone oil-free outer layer is corona treated in order to improve the printability. The transfer of silicone oil to the surface of this treated, second outer layer subsequently takes place owing to contact with the silicone oil-containing first outer layer. This feature gives a silicone oil-containing film having good surface-slip characteristics which is simultaneously readily printable on the corona-treated side and is nevertheless heat-sealable. This film has the disadvantage that it can only be printed on one side. This is particularly disadvantageous for use of the film in the packaging sector. Packaging frequently requires further labeling on its second surface, for example a bar code, and for this reason requires a film having good surface-slip characteristics which can be printed on both sides. In addition, it has proven disadvantageous that the pretreatment intensity of the corona-treated surface is no longer measurable due to the silicone (siloxane). This means that it is not easy for the film processor to check the surface tension of the film, an important quality feature. The processing properties of the film are also unsatisfactory.

By applying the known teaching, it has been found that conventional $SiO_2$ in the production of the films results in deposits on the die lip and in considerable abrasion on the rolls over which the film passes during production. It has been found that this abrasion is caused by the $SiO_2$ present in the outer layers. This abrasion results in a number of problems. The die lip and the rolls must be cleaned frequently, since the film otherwise runs poorly during production. The deposits on the die lip result in streaking on the film, which impairs the film's appearance. In addition, these impurities cause problems during corona treatment. The corona treatment breaks through in the areas of the roll where $SiO_2$ abrasion has occurred and results in the undesired phenomenon known as the reverse-side effect. This causes unacceptable flaws during further processing of the film, such as, for example, printing or metallization. The films finished in the usual way with $SiO_2$ are also unsatisfactory with respect to their roll make up and their blocking behavior at elevated temperature.

SUMMARY OF THE INVENTION

The present invention thus has the object of providing a multilayer polyolefin, preferably polypropylene film which does not have the disadvantages of the films described in the related art above, and is particularly suitable for further processing. The film should have a low coefficient of friction and excellent antistatic properties. A further object of the present invention is that the film is heat-sealable and printable. However, these improvements should not impair the appearance of the film, i.e., the film should simultaneously have both very low haze and high gloss.

Other objects of the present invention are to provide a process for the production of the multilayer polyolefin film by a coextrusion process and a method of using the multilayer polypropylene film as a packaging film and/or for printing purposes.

Another object of the invention is to provide a laminate made of the multilayer polyolefin film and paper or board or another thermoplastic film.

In accomplishing the foregoing objects, there has been provided according to the present invention an oriented, multilayer polyolefin film comprising a base layer essentially comprising polypropylene, and at least one heat-sealable outer layer, wherein the heat-sealable outer layer contains from about 0.1 to 0.5% by weight of $SiO_2$, based on the weight of the outer layer, said $SiO_2$ having been subjected to organic aftertreatment coating and having a mean particle diameter from about 2 to 6 µm, preferably from about 2 to 5 µm, more preferably from about 4 to 5 µm, and even more preferably about 4 µm and wherein the ratio between the mean particle diameter and the outer layer thickness is in the range from about 3 to 11. Preferably the $SiO_2$ has a carboxylic acid-containing coating.

The present invention also provides a process for the production of the multilayer polyolefin film as described above, comprising the steps of coextruding melts corresponding to the individual layers of the film through a flat-film die, taking the coextruded film off over a take-off roll whose temperature is between about 80° and 110° C., biaxially stretching the film with a longitudinal stretching ratio of about 4:1 to 7:1 and a transverse stretching ratio of about 8:1 to 10:1, heat-setting the biaxially stretched film, and corona treating if desired followed by a subsequent wind up.

The present invention also provides a method of using the multilayer polyolefin film as described above as a packaging film and/or for printing.

The present invention further provides a laminate comprising the multilayer polyolefin film described above and paper or board or a further film made from a thermoplastic.

Further objects, features and advantages of the present invention will become apparent from the detailed description of preferred embodiments which follow.

DETAILED DESCRIPTION OF THE PREFERRED EMBODIMENTS

The present invention comprises a film of the generic type mentioned at the outset, wherein the heat-sealable outer layer contains from about 0.1 to 0.5% by weight of $SiO_2$, based on the weight of the outer layer, which has been subjected to organic aftertreatment coating and has a mean particle diameter of from about 2 to 6 µm, preferably from about 4 to 5 µm, where the ratio between the mean particle diameter and the outer layer thickness is in the range from about 3 to 11.

The base layer of the multilayer film according to the invention essentially comprises a polypropylene polymer and any additives used in effective amounts in each case.

The polypropylene polymer comprises predominantly (at least about 90%) of propylene and has a melting point of about 140° C. or above, preferably from about 150° to 170° C. Isotactic homopolypropylene having an n-heptane-soluble content of 6% by weight or less, based on the isotactic homopolypropylene, copolymers of ethylene and propylene having an ethylene content of about 5% by weight or less, copolymers of propylene with $C_4$–$C_8$-α-olefins having an α-olefin content of about 5% by weight or less are preferred polypropylene polymers for the base layer, particular preference being given to isotactic polypropylene. The polypropylene polymer of the base layer generally has a melt flow index of from about 0.5 g/10 min to about 10 g/10 min, preferably from about 1.5 g/10 min to about 4 g/10 min, at about 230° C. and a force of about 21.6N (DIN 53 735). The percentages by weight given relate to the particular copolymer.

For the purposes of the present invention, heat-sealable polyolefin polymers are defined as copolymers and terpolymers of propylene and mixtures of two or more of these copolymers and/or terpolymers. The copolymers and terpolymers contain propylene as the principal component in an amount of at least about 50% by weight, based on the particular polymer. Suitable comonomers are ethylene and α-olefins having 4 to 10 carbon atoms. It has proven particularly advantageous for the invention to use propylene-ethylene copolymers, propylene-butylene copolymers and propylene-ethylene-butylene terpolymers, and mixtures of one or more of these polypropylene polymers.

Particular preference is given to random ethylene-propylene copolymers having an ethylene content from about 2 to 10% by weight, and preferably from about 5 to 8% by weight, or random propylene-1-butylene copolymers having a butylene content from about 4 to 25% by weight, preferably from about 10 to 20% by weight, in each case based on the total weight of the copolymer, or random ethylene-propylene-1-butylene terpolymers having an ethylene content from about 1 to 10% by weight, preferably from about 2 to 6% by weight, and a 1-butylene content of from about 3 to 20% by weight, preferably from about 8 to 10% by weight, in each case based on the total weight of the terpolymer, or a blend of an ethylene-propylene-1-butylene terpolymer and a propylene-1-butylene copolymer having an ethylene content from about 0.1 to 7% by weight, a propylene content from about 50 to 90% by weight and a 1-butylene content of from about 10 to 40% by weight, in each case based on the total weight of the polymer blend.

The multilayer film according to the invention comprises at least the above-described base layer and at least one outer layer comprising the above-described heat-sealable propylene polymers or mixtures thereof. In a preferred embodiment, the outer layer essentially comprises one of the copolymers and terpolymers mentioned above or mixtures thereof, as likewise mentioned above. Depending on its intended application, the multilayer film may have a further outer layer on the opposite side. In a preferred embodiment, the multilayer film has three layers with identical or different outer layers.

The thickness of the outer layer(s) is greater than about 0.4 µm and is preferably in the range from about 0.4 to 2 µm, in particular from about 0.5 to 1 µm, where outer layers on both sides may have the same or different thicknesses.

The overall thickness of the multilayer polyolefin film according to the invention can vary within broad limits and depends on the intended application. It is preferably from about 5 to 70 µm, in particular from about 10 to 50 µm, the base layer making up from about 50 to 90% of the overall film thickness.

The outer layer contains from about 0.1 to 0.5% by weight of $SiO_2$, based on the weight of the outer layer, which $SiO_2$ has been subjected to organic after treatment coating and has a mean particle diameter from about 3 to 6 μm, where the ratio between the particle diameter and the outer layer thickness is in the range from about 3 to 11, preferably from about 4 to 10, in particular from about 6 to 8. $SiO_2$ is generally prepared by grinding silica gel and is a synthetic, highly porous, pure silicic acid which has a completely amorphous structure, in contrast to crystalline silicic acids. The $SiO_2$ content is generally greater than about 95%, in particular in the range from about 98 to 99.5%. According to the invention, the $SiO_2$ particles have been subjected to organic aftertreatment coating and have a coating containing from about 0.5 to 5% by weight of an aliphatic carboxylic acid. Preferred aliphatic carboxylic acids are aliphatic hydroxydi- and -tricarboxylic acids or stearic acid. In general, the acids contain two to five, preferably two to three, hydroxyl groups. Preferred aliphatic carboxylic acids are tartronic acid (hydroxymalonic acid), malic acid (monohydroxysuccinic acid), tartaric acid (dihydroxysuccinic acid) and citric acid. Coatings containing citric acid have proven particularly advantageous. Due to the organic coating, the $SiO_2$ particles are slightly acidic in aqueous solutions. The pH of about a 5% strength aqueous suspension is in the range from about 3 to 5, and is preferably about 4.

Surprisingly, $SiO_2$-containing films which satisfy the above-mentioned conditions have excellent antistatic properties and very minimal blocking behavior at elevated temperature in addition to a particularly good coefficient of friction. It has been found that the amounts in which antistatics are usually added can be greatly reduced.

In order to achieve these improvements, it is essential to observe a ratio between the particle diameter and the outer layer thickness in the range from about 3 to 11, preferably from about 5 to 8, and simultaneously to use an $SiO_2$ which has been subjected to organic aftertreatment coating. These measures furthermore allow the abrasion on the rolls during the production process to be drastically reduced. Additional purification measures, which considerably increase the production costs, are therefore no longer necessary. Reverse-side effects during corona treatment are virtually non-existent.

In a further preferred embodiment, in addition to this selected outer layer additive, the multilayer film according to the invention may additionally contain neutralizers, stabilizers, lubricants, low-molecular-weight hydrocarbon resins and antistatics. The percentages by weight given below relate to the weight of the respective layer to which the additive has been added.

Neutralizers are preferably calcium stearate and/or calcium carbonate having a mean particle size of at most about 0.7 μm, an absolute particle size of less than about 10 μm and a specific surface area of at least about 40 $m^2/g$.

Stabilizers which can be added are conventional stabilizing compounds for polymers of ethylene, propylene and other α-olefins. The amount in which they are added is between about 0.05 and 2% by weight. Particularly suitable are phenolic stabilizers, alkali/alkaline earth metal stearates and/or alkali/alkaline earth metal carbonates.

Phenolic stabilizers are preferred in an amount from about 0.1 to 0.6% by weight, in particular from about 0.15 to 0.3% by weight, and having a molecular weight of greater than about 500 g/mol. Pentaerythrityl tetrakis[3-(3,5-di-tert-butyl-4-hydroxyphenyl)propionate] and 1,3,5-trimethyl-2,4,6-tris(3,5-di-tert-butyl-4hydroxybenzyl)benzene are particularly advantageous.

Lubricants are higher aliphatic acid amides, higher aliphatic acid esters, waxes and metal soaps, and polydimethylsiloxanes. The effective amount of lubricant is in the range from about 0.1 to 3% by weight. The addition of higher aliphatic acid amides in the range from about 0.15 to 0.25% by weight to the base layer and/or the outer layers is particularly suitable. A particularly suitable aliphatic acid amide is erucamide.

The low-molecular-weight resin recommended is a natural or synthetic resin having a softening point from about 60° to 180° C., preferably from about 80° to 150° C., determined in accordance with ASTM E-28. The term "low-molecular-weight" indicates a molecular weight that is significantly lower than that of the film forming propylene polymers which have usually a molecular weight of more than 100000. Generally the resins have a molecular weight of about 300 to about 8000, preferably 400 to 5000, most preferred of 500 to 2000. Of the numerous low-molecular-weight resins, preference is given to hydrocarbon resins, specifically in the form of petroleum resins, styrene resins, cyclopentadiene resins and terpene resins (these resins are described in Ullmanns Encyklopädie der technischen Chemie [Ullmann's Encyclopedia of Industrial Chemistry], 4th Edition, Volume 12, pages 525 to 555). The effective amount of low-molecular-weight resin is from about 3 to 15% by weight, preferably from about 5 to 10% by weight, based on the layer. Suitable petroleum resins are described in numerous specifications, such as EP-A-0 180 087, which reference is expressly incorporated herein in its entirety.

Preferred antistatics are alkali metal alkanesulfonates, polyether-modified, i.e., ethoxylated and/or propoxylated, polydiorganosiloxanes (polydialkylsiloxanes, polyalkylphenylsiloxanes and the like) and/or the essentially straight-chain and saturated, aliphatic, tertiary amines containing an aliphatic radical having 10 to 20 carbon atoms which are substituted by ω-hydroxy-$(C_1–C_4)$-alkyl groups, N,N-bis(2-hydroxyethyl)alkylamines having 10 to 20 carbon atoms, preferably 12 to 18 carbon atoms, in the alkyl radical being particularly suitable. The effective amount of antistatic is in the range from about 0.05 to 3% by weight. A further preferred antistatic is glycerol monostearate.

The invention furthermore relates to a process for the production of the multilayer film according to the invention by the coextrusion process known per se. This process is carried out by coextruding the melts corresponding to the individual layers of the film through a flat-film die, taking the resultant film off over one or more rolls for solidification, subsequently stretching (orienting) the film biaxially, heat-setting the biaxially stretched film and, if desired, corona or flame treating it on the surface layer intended for the treatment.

The biaxial stretching (orientation) can be carried out simultaneously or consecutively, preference being given to consecutive biaxial stretching, in which the stretching is first carried out longitudinally (in the machine direction) and then transversely (perpendicular to the machine direction).

As is conventional in the coextrusion process, the polymer or polymer mixture of individual layers is first compressed and liquified in an extruder, with it being possible for any additives already to be present in the polymer or in the polymer mixture. The melts are then simultaneously forced through a flat-film die, and the extruded multilayer film is taken off over one or more take-off rolls, during which it cools and solidifies.

The resultant film is then stretched longitudinally and transversely to the extrusion direction, which results in orientation of the molecular chains. The stretching is preferably from about 4:1 to 7:1 in the longitudinal direction and from about 8:1 to 10:1 in the transverse direction. The longitudinal stretching is expediently carried out with the aid of two rolls rotating at different speeds corresponding to the desired stretching ratio, and the transverse stretching is carried out with the aid of an appropriate tenter frame.

The biaxial stretching of the film is followed by heat setting, during which the film is kept at a temperature from about 140° to 160° C. for about 0.5 to 10 seconds. The film is subsequently wound up in the conventional manner using a wind-up unit.

It has proven particularly favorable to keep the take-off roll or rolls, which also cool and solidify the extruded film, at a temperature from about 50° to 110° C.

The temperatures at which longitudinal and transverse stretching are carried out can vary. In general, the longitudinal stretching is preferably carried out at about 120° to 150° C. and the transverse stretching at about 155° to 190° C.

As mentioned above, one or both surfaces of the film can, if desired, be corona or flame treated by one of the known methods after the biaxial stretching.

In the case of corona treatment, it is expedient to pass the film between two conductor elements serving as electrodes, with such high voltage, usually an alternating voltage (from about 10 to 20 kV and 20 to 40 kHz) being applied between electrodes so that spray or corona discharges can occur. The spray or corona discharge ionizes the air above the film surface, causing it to react with the molecules of the film surface, so that polar inclusions are formed in the essentially non-polar polymer matrix.

For flame treatment with a polarized flame (see U.S. Pat. No. 4,622,237), a direct electrical voltage is applied between a burner (negative pole) and a chill roll. The level of the applied voltage is between about 500 and 3000 V, preferably in the range from about 1500 to 2000 V. Due to the applied voltage, the ionized atoms accelerate and hit the polymer surface with greater kinetic energy. The chemical bonds within the polymer molecule are easier to break, and free-radical formation proceeds more quickly. The thermal load on the polymer during this process is significantly less than in the case of standard flame treatment, and films can be obtained in which the heat-sealing properties of the treated side are even better than those of the untreated side.

The film according to the invention is distinguished by a very low coefficient of friction (from about 0.2 to 0.3) in combination with good antistatic properties. In addition, the film is very readily heat-sealable and printable. The film is not impaired in gloss and haze compared with known films. The film is very readily convertible and consequently exhibits excellent roll make up. The film has very low blocking values at elevated temperature.

It has been found that, if coated $SiO_2$ is used, there is virtually no $SiO_2$ abrasion on the rolls or on the die lip during production. The corona treatment can be carried out easily without reverse-side effects occurring. There are thus no problems during further processing. The establishment of a certain ratio between particle diameter and outer layer thickness ensures excellent roll make up and very low blocking values at elevated temperature. It has been found that, if the particle size and outer layer thickness are balanced, the $SiO_2$ particles project out of the outer layer in a uniform distribution and only then are the film properties improved in the manner described.

The invention is now described in greater detail with reference to working examples.

EXAMPLE 1

A three-layer film having an overall thickness of 20 µm and an ABA layer structure, i.e., the base layer B was surrounded by two identical outer layers A, was produced by coextrusion and subsequent stepwise orientation in the longitudinal and transverse directions.

The film was subjected to corona treatment on one side before winding up. The surface tension on this side as a consequence of this treatment was from 39 to 40 mN/m. All layers contained 0.13% by weight of pentaerythrityl tetrakis [4-(3,5-di-tert-butyl-4-hydroxyphenyl)propionate] (Irganox® 1010) as stabilizer and 0.06% by weight of calcium stearate as neutralizer.

The base layer B essentially comprised a polypropylene homopolymer having an n-heptane-soluble content of 4% by weight and a melting point of from 160° to 162° C. The melt flow index of the polypropylene homopolymer was 3.4 g/10 min at 230° C. and a load of 1.6N (DIN 53 735). The base layer contained 0.12% by weight of erucamide having a melting point of from 78° to 82° C.

The polyolefinic outer layers essentially comprised a random ethylene-propylene copolymer having a content of 4.0% by weight of ethylene and 95.5% by weight of propylene. The outer layers contained 0.30% by weight of a citric acid-coated silicon dioxide having a mean particle diameter of 4 µm. Each of the outer layers had a thickness of 0.7 µm. The ratio between the mean particle diameter and the outer layer thickness was 5.7.

EXAMPLE 2

Example 1 was repeated, but the polyolefinic outer layers comprised an ethylene-propylene-1-butene terpolymer having a content of 3.5% by weight of ethylene, 88.5% by weight of propylene and 8% by weight of 1-butene. The outer layers contained 0.35% by weight of a citric acid-coated silicon dioxide having a mean particle diameter of 4 µm. Each of the outer layers had a thickness of 0.6 µm. The ratio between the mean particle diameter and the outer layer thickness was 6.7.

EXAMPLE 3

Example 1 was repeated, but the polyolefinic outer layers comprised a blend of an ethylene-propylene-1-butene terpolymer and a propylene-1-butene copolymer having a content of 0.7% by weight of ethylene, 81.3% by weight of propylene and 18.0% by weight of 1-butene, in each case based on the total weight of the polymer blend. The outer layers contained 0.35% by weight of a citric acid-coated silicon dioxide having a mean particle diameter of 4 µm. Each of the outer layers had a thickness of 0.8 µm. The ratio between the mean particle diameter and the outer layer thickness was 5.0.

EXAMPLE 4

Example 2 was repeated, but each of the outer layers had a thickness of 0.9 µm. The ratio between the mean particle diameter and the outer layer thickness was 4.4.

EXAMPLE 5

Example 2 was repeated, but the polyolefinic outer layers contained 0.30% by weight of a citric acid-coated silicon dioxide having a mean particle diameter of 5 μm. Each of the outer layers had a thickness of 0.7 μm. The ratio between the mean particle diameter and the outer layer thickness was 7.1.

Comparative Example 1

Example 2 was repeated, but the silicon dioxide employed was not coated.

Comparative Example 2

Example 2 was repeated, but the thickness of the polyolefinic outer layers was 0.3 μm. The ratio between the mean particle diameter and the outer layer thickness was 13.3.

Comparative Example 3

Example 2 was repeated, but the thickness of the polyolefinic outer layers was 1.6 μm. The ratio between the mean particle diameter and the outer layer thickness was 2.5.

Comparative Example 4

Example 5 was repeated, but the silicon dioxide employed had a mean particle diameter of 5 μm and was not coated. Each of the outer layers had a thickness of 0.4 μm. The ratio between the mean particle diameter and the outer layer thickness was 12.5.

Comparative Example 5

Example 2 was repeated, but the silicon dioxide employed had a mean particle diameter of 1 μm.

The properties of films in the examples and comparative examples are shown in Tables 1 and 2 below.

In order to characterize the raw materials and the films, the following measurement methods were used:

Melt flow index

The melt flow index was measured in accordance with DIN 53 735 at a load of 21.6N and at 230° C. or at a load of 50N and at 190° C.

Melting point

DSC measurement, maximum of the melting curve, heating rate 20° C./min.

Seal seam strength

For the determination, two 15 mm wide film strips were laid one on top of the other and heat-sealed for 0.5 seconds at 130° C. and a pressure of 1.5N/mm$^2$ (Brugger NDS instrument, sealing jaws heated on one side). The seal seam strength was determined by the T-peel method.

Friction

The friction was determined in accordance with DIN 53 375.

Surface tension

The surface tension was determined by the ink method (DIN 53 364).

Blocking values at elevated temperature

The elevated-temperature blocking test involves measurement of the push-off forces (N) necessary to move or separate two film-wrapped packs which had been exposed to a temperature of 70° C. and a weight of 200 g for 2 hours.

Evidence of organic coating

An organic aftertreatment coating of the SiO$_2$ particles can be detected by RMA. To this end, the film surface is etched with oxygen for 15 minutes, so that the SiO$_2$ particles present in the film are exposed. An ESCA measurement is carried out on these SiO$_2$ particles uncovered by etching. Organically coated SiO$_2$ particles have a carbon and oxygen peak in the ESCA spectrum; this is not found in uncoated particles.

TABLE 1

| | Coefficient of friction | | | Blocking values at elevated temperature [N] | Seal seam strength (HSE) (130° C., 1.5 N/mm$^2$, 0.5 s) [N/15 mm] | |
|---|---|---|---|---|---|---|
| | Die deposits | Roll abrasion | 14 days after production | | Side 1/2 | Side 2/2 |
| E1 | none | no | 0.23 | 1.2 | 1.4 | 1.6 |
| E2 | none | no | 0.21 | 0.9 | 2.0 | 2.3 |
| E3 | none | no | 0.26 | 2.5 | 2.3 | 2.8 |
| E4 | none | no | 0.24 | 1.5 | 2.2 | 2.5 |
| E5 | none | no | 0.20 | 0.8 | 2.3 | 2.6 |
| CE1 | heavy | heavy | 0.29 | 4.2 | 1.9 | 2.2 |
| CE2 | heavy | heavy | 0.38 | 5.4 | 0.5 | 0.7 |
| CE3 | none | none | 0.36 (tendency to block) | 8.5 | 2.4 | 2.6 |
| CE4 | very heavy | very heavy | 0.39 | 6.0 | 0.4 | 0.7 |
| CE5 | moderate | moderate | 0.38 (tendency to block) | >10 | 2.1 | 2.3 |

E = Example
CE = Comparative Example
1st side is corona treated
2nd side is not corona treated. 2nd side can be corona treated if printability on both sides is required.

TABLE 2

| | Pretreatment intensity 14 days after production [mN/m] | | Reverse-side effect of the 2nd, non-corona-treated side | Blocking after printing | Printing errors as a consequence of the reverse-side effect |
|---|---|---|---|---|---|
| | Side 1 | Side 2 | | | |
| E1 | 39 | <30 | no | no | no |
| E2 | 39 | <30 | no | no | no |
| E3 | 38 | <30 | no | no | no |
| E4 | 39 | <30 | no | no | no |
| E5 | 39 | <30 | no | | |
| CE1 | 39 | <30 | strong | yes | yes |
| CE2 | 36 | <30 | strong | yes | yes |
| CE3 | 39 | <30 | no | no | no |
| CE4 | 37 | <30 | very strong | yes | yes |

TABLE 2-continued

| | Pretreatment intensity 14 days after production [mN/m] | | Reverse-side effect of the 2nd, non-corona-treated side | Blocking after printing | Printing errors as a consequence of the reverse-side effect |
|---|---|---|---|---|---|
| | Side 1 | Side 2 | | | |
| CE5 | 39 | <30 | no | yes | yes |

What is claimed is:

1. An oriented, multilayer polyolefin film comprising a base layer essentially comprising polypropylene, and at least one heat-sealable outer layer, wherein the heat-sealable outer layer contains from about 0.1 to 0.5% by weight of $SiO_2$, based on the weight of the outer layer, said $SiO_2$ having been subjected to organic aftertreatment coating and having a mean particle diameter from about 2 to 6 μm, and wherein the ratio between the mean particle diameter and the outer layer thickness is in the range from about 3 to 11.

2. A multilayer polyolefin film as claimed in claim 1, wherein the $SiO_2$ has a carboxylic acid-containing coating.

3. A multilayer polyolefin film as claimed in claim 1, wherein the $SiO_2$ has a mean particle diameter from about 4 to 5 μm.

4. A multilayer polyolefin film as claimed in claim 1, wherein the $SiO_2$ has a mean particle diameter from about 2 to 5 μm.

5. A multilayer polyolefin film as claimed in claim 1, wherein the $SiO_2$ has a mean particle diameter of about 4 μm.

6. A multilayer polyolefin film as claimed in claim 1, wherein said ratio is from about 4 to 10.

7. A multilayer polyolefin film as claimed in claim 1, wherein said ratio is from about 6 to 8.

8. A multilayer polyolefin film as claimed in claim 2, wherein the carboxylic acid is an aliphatic carboxylic acid.

9. A multilayer polyolefin film as claimed in claim 8, wherein the aliphatic carboxylic acid is selected from the group consisting of hydroxydicarboxylic acids, tricarboxylic acids, stearic acid, carboxylic acids containing 2–5 hydroxyls or carboxylic acids containing 2–3 hydroxyls.

10. A multilayer polyolefin film as claimed in claim 2, wherein the carboxylic acid is selected from the group consisting of tartronic acid, malic acid, tartaric acid or citric acid.

11. A multilayer polyolefin film as claimed in claim 2, wherein the carboxylic acid is tartronic acid.

12. A multilayer polyolefin film as claimed in claim 2, wherein the carboxylic acid is malic acid.

13. A multilayer polyolefin film as claimed in claim 2, wherein the carboxylic acid is tartaric acid.

14. A multilayer polyolefin film as claimed in claim 2, wherein the carboxylic acid is citric acid.

15. A packaged article comprising the multilayer polyolefin film as claimed in claim 1 as a packaging film surrounding at least in part an article.

16. A multilayer polyolefin film as claimed in claim 1, wherein the heat-sealable outer layer has a thickness greater than about 0.4 μm.

17. A multilayer polyolefin film as claimed in claim 1, wherein the overall thickness of the polyolefin film is within the range of 5 to 70 μm.

18. A multilayer polyolefin film as claimed in claim 17, wherein the base layer makes up from about 50 to 90% of the overall film thickness.

* * * * *